(12) United States Patent
Chang et al.

(10) Patent No.: US 11,942,872 B2
(45) Date of Patent: Mar. 26, 2024

(54) MULTI-PATH RESONANT CIRCUIT AND RESONANT CONVERTER

(71) Applicant: Guangdong Sofar Smart Solar Technology Co., Ltd., Huizhou (CN)

(72) Inventors: Lei Chang, Huizhou (CN); Xinwei Liu, Huizhou (CN); Dongdong Yang, Huizhou (CN); Hongyuan Jin, Huizhou (CN)

(73) Assignee: GUANGDONG SOFAR SMART SOLAR TECHNOLOGY CO., LTD., Huizhou (CN)

( * ) Notice: Subject to any disclaimer, the term of this patent is extended or adjusted under 35 U.S.C. 154(b) by 0 days.

(21) Appl. No.: 18/164,666

(22) Filed: Feb. 6, 2023

(65) Prior Publication Data
US 2023/0353061 A1 Nov. 2, 2023

(30) Foreign Application Priority Data
Apr. 28, 2022 (CN) .......................... 202210471017.X

(51) Int. Cl.
*H02M 1/00* (2006.01)
*H02M 1/04* (2006.01)
(Continued)

(52) U.S. Cl.
CPC ....... *H02M 7/4815* (2021.05); *H02M 1/0064* (2021.05); *H02M 1/04* (2013.01); *H02M 3/01* (2021.05); *H02M 3/285* (2013.01); *H02M 7/493* (2013.01); *H02M 3/1584* (2013.01); *H02M 3/1586* (2021.05); *H02M 3/33523* (2013.01)

(58) Field of Classification Search
CPC .... H02M 1/0003; H02M 1/0058; H02M 1/04; H02M 1/4241; H02M 3/01; H02M 3/015; H02M 3/335; H02M 3/3378; H02M 7/48; H02M 7/4811; H02M 7/4815; H02M 7/4818; H02M 7/4826; H02M 7/49;
(Continued)

(56) References Cited

U.S. PATENT DOCUMENTS 9,236,808 B1 * 1/2016 Hung ..................... H02M 3/285
11,018,589 B1 * 5/2021 Huang ..................... H02M 7/08
(Continued)

FOREIGN PATENT DOCUMENTS

CN    102611315 A      7/2012
CN    106936320 A  *   7/2017  .......... H02M 3/1584
(Continued)

*Primary Examiner* — Thienvu V Tran
*Assistant Examiner* — Shahzeb K Ahmad
(74) *Attorney, Agent, or Firm* — IPRO, PLLC

(57) ABSTRACT

The present application discloses a multi-path resonant circuit and a resonant converter. The multi-path resonant circuit includes at least two parallel N-phase resonant circuits, wherein N is an integer greater than or equal to 3. The at least two parallel N-phase resonant circuits include a first N-phase resonant circuit and a second N-phase resonant circuit. A first resonant inductor in any phase resonant circuit of the first N-phase resonant circuit is coupled with a second resonant inductor in any phase resonant circuit of the second N-phase resonant circuit. In this way, current sharing of the multi-path resonant circuit can be realized through a simpler structure.

16 Claims, 6 Drawing Sheets

(51) Int. Cl.
*H02M 3/00* (2006.01)
*H02M 3/28* (2006.01)
*H02M 7/48* (2007.01)
*H02M 7/493* (2007.01)
*H02M 3/158* (2006.01)
*H02M 3/335* (2006.01)

(58) Field of Classification Search
CPC ....... H02M 7/493; H02M 7/523; H01F 27/24; H01F 27/28; H01F 27/2895; H01F 27/34
See application file for complete search history.

(56) References Cited

U.S. PATENT DOCUMENTS

| | | | |
|---|---|---|---|
| 2015/0349649 A1* | 12/2015 | Zane | H02M 3/1584 363/21.03 |
| 2017/0008405 A1* | 1/2017 | Bojarski | H02M 7/537 |
| 2022/0140738 A1* | 5/2022 | Lin | H02M 3/33584 363/17 |
| 2022/0310303 A1* | 9/2022 | Wang | H01F 37/00 |

FOREIGN PATENT DOCUMENTS

| | | | | |
|---|---|---|---|---|
| CN | 112350604 A | | 2/2021 | |
| EP | 3772170 A1 | * | 2/2021 | ............ H02M 3/335 |
| EP | 3772170 A1 | | 2/2021 | |
| TW | 759932 B | | 4/2022 | |

\* cited by examiner

MULTI-PATH RESONANT CIRCUIT AND RESONANT CONVERTER

CROSS-REFERENCE TO RELATED APPLICATIONS

This application is based upon and claims priority to Chinese Patent Application No. 202210471017.X, filed with the Chinese Patent Office on Apr. 28, 2022, titled "Multi-PATH resonant circuit and resonant converter", the entire contents of which are incorporated herein by reference.

TECHNICAL FIELD

The present application relates to the technical field of electronic circuits, and in particular, relates to a multi-path resonant circuit and a resonant converter.

BACKGROUND

With the development of "new infrastructure construction", 5G base stations, IDC data centers, new energy vehicles or the like have experienced explosive growth, and correspondingly, demands for medium and large power supply equipments are increasing day by day in the industries. In order to realize product requirements more economically and efficiently under the existing technical conditions of devices, it is common to form a power module by parallel connection of multiple basic power units.

SUMMARY

In a first aspect, the present application discloses a multi-path resonant circuit, the multi-path resonant circuit includes:
  at least two parallel N-phase resonant circuits, N being an integer greater than or equal to 3;
  the at least two parallel N-phase resonant circuits comprising a first N-phase resonant circuit and a second N-phase resonant circuit;
  a first resonant inductor in any phase resonant circuit of the first N-phase resonant circuit is coupled with a second resonant inductor in any phase resonant circuit of the second N-phase resonant circuit.

In a second aspect, the present application discloses a resonant converter, the resonant converter includes a multi-path resonant circuit as described above.

BRIEF DESCRIPTION OF DRAWINGS

One or more embodiments are illustrated by pictures in corresponding attached drawings, and this does not constitute limitation on the embodiments. Elements with the same reference numerals in the attached drawings are shown as similar elements, and the pictures in the attached drawings do not constitute scale limitation unless otherwise stated particularly.

DETAILED DESCRIPTION

In order to make the objectives, technical solutions and advantages of the embodiments of the present application clearer, the technical solutions in the embodiments of the present application will be clearly and completely described below with reference to the attached drawings in the embodiments of the present application. Obviously, the embodiments described are only part but not all of the embodiments of the present application. Based on the embodiments in the present application, all other embodiments obtained by those of ordinary skill in the art without creative labor belong to the scope claimed in the present application.

The multi-phase resonant circuit is a basic power unit commonly used at present. However, due to the error of electrical parameters of resonant elements in the multi-phase resonant circuit, the output currents of different phase resonant circuits in the multi-phase resonant circuit are often uneven, and switches and other elements in the multi-phase resonant circuit may be damaged due to overheating and other abnormalities.

Figure 1:
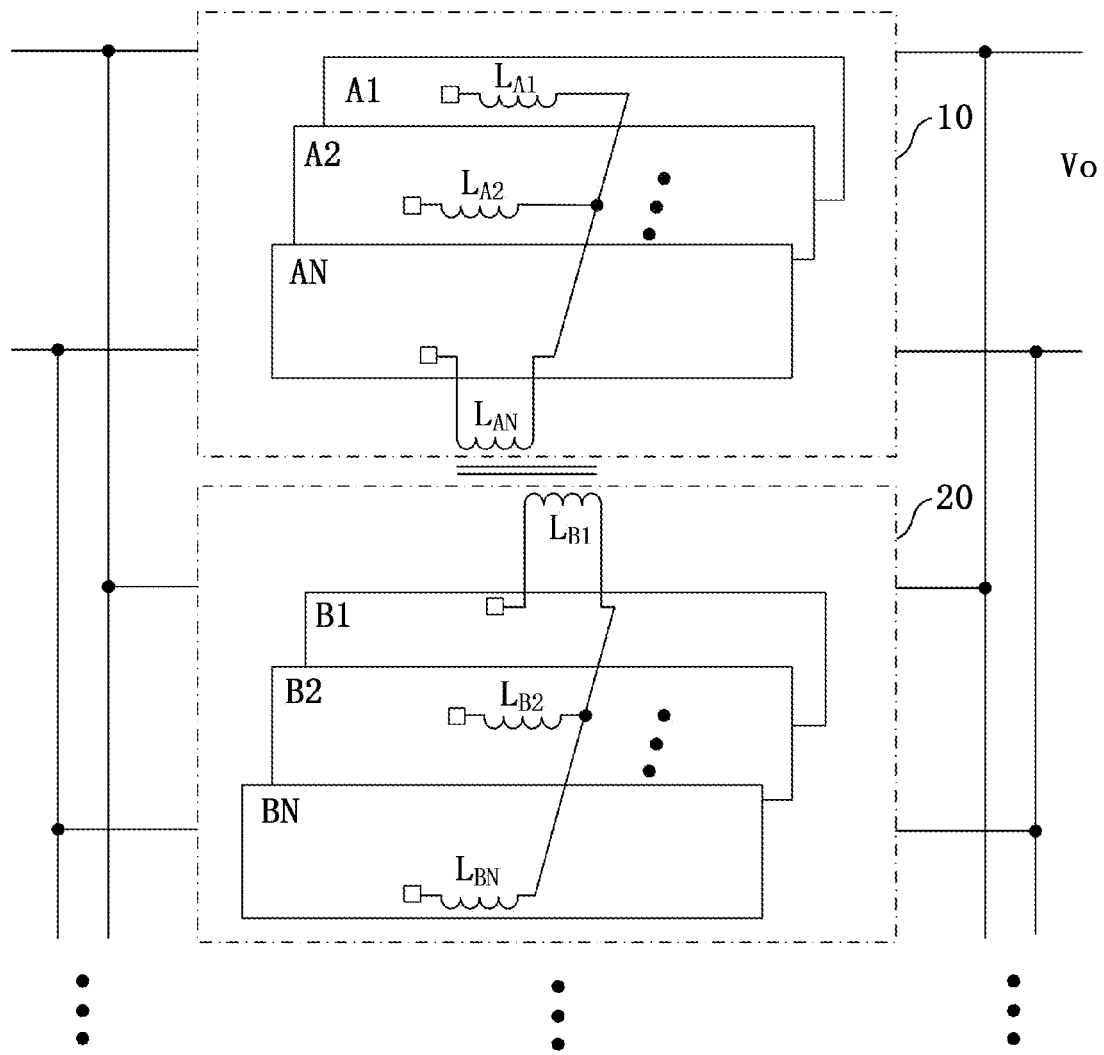
FIG. 1 is a schematic structural diagram of a multi-path resonant circuit according to an embodiment of the present application.

Please refer to FIG. 1, which is a schematic view of the circuit structure of a multi-path resonant circuit provided according to an embodiment of the present application. As shown in FIG. 1, the multi-path resonant circuit comprises at least two parallel N-phase resonant circuits, where N is an integer greater than or equal to 3. That is, the at least two N-phase resonant circuits are connected in parallel, and the number of phases N of each resonant circuit is an integer greater than or equal to 3. In FIG. 1, two parallel N-phase resonant circuits are taken as an example. That is, the at least two parallel N-phase resonant circuits comprise a first N-phase resonant circuit 10 and a second N-phase resonant circuit 20, and the first N-phase resonant circuit 10 and the second N-phase resonant circuit 20 are connected in parallel.

A first resonant inductor in any phase resonant circuit of the first N-phase resonant circuit 10 is coupled with a second resonant inductor in any phase resonant circuit of the second N-phase resonant circuit 20. Specifically, the first N-phase resonant circuit 10 comprises a first phase resonant circuit A1, a second phase resonant circuit A2, . . . , and a Nth phase resonant circuit AN, and the second N-phase resonant circuit 20 comprises a first phase resonant circuit B1, a second phase resonant circuit B2, . . . , and a Nth phase resonant circuit BN. A resonant inductor $L_{AN}$ of the Nth phase resonant circuit AN of the first N-phase resonant circuit 10 serves as the first resonant inductor, and a resonant inductor $L_{B1}$ of the first phase resonant circuit B1 of the second N-phase resonant circuit 20 serves as the second resonant inductor, so that the resonant inductor $L_{AN}$ of the Nth phase resonant circuit AN of the first N-phase resonant circuit 10 is coupled with the resonant inductor $L_{B1}$ of the first phase resonant circuit B1 of the second N-phase resonant circuit 20 to realize current sharing between the output current of the Nth phase resonant circuit AN of the first N-phase resonant circuit 10 and the output current of the first phase resonant circuit B1 of the second N-phase resonant circuit 20.

Meanwhile, when N≥3, usually respective phase resonant circuits in the first N-phase resonant circuit 10 can achieve automatic current sharing, and respective phase resonant circuits in the second N-phase resonant circuit 20 can also achieve automatic current sharing. That is, the output currents of the first phase resonant circuit A1, the second phase resonant circuit A2, . . . , and the Nth phase resonant circuit AN can achieve automatic current sharing, i.e., the output currents of the first phase resonant circuit A1, the second phase resonant circuit A2, . . . , and the Nth phase resonant circuit AN are substantially equal. The output currents of the first phase resonant circuit B1, the second phase resonant circuit B2, . . . , and the Nth phase resonant circuit BN can also achieve automatic current sharing, i.e., the output currents of the first phase resonant circuit B1, the second phase resonant circuit B2, . . . , and the Nth phase resonant circuit BN are also substantially equal. Then, when the output current of the Nth phase resonant circuit AN of the first N-phase resonant circuit 10 is substantially equal to the output current of the first phase resonant circuit B1 of the second N-phase resonant circuit 20, both the output currents of the first N-phase resonant circuit and the second N-phase resonant circuit achieve current sharing, i.e., the output currents of the first phase resonant circuit A1, the second phase resonant circuit A2, . . . , and the Nth phase resonant circuit AN as well as the output currents of the first phase resonant circuit B1, the second phase resonant circuit B2, . . . , and the Nth phase resonant circuit BN are substantially equal. At this point, it is possible to reduce the probability that switches and other elements are damaged due to uneven output current.

As shall be appreciated, in this embodiment, the resonant inductor $L_{AN}$ of the Nth phase resonant circuit AN of the first N-phase resonant circuit 10 is coupled with the resonant inductor $L_{B1}$ of the first phase resonant circuit B1 of the second N-phase resonant circuit 20 as an example. In other embodiments, other two resonant inductors may be coupled. For example, the resonant inductor $L_{A1}$ of the first phase resonant circuit A1 of the first N-phase resonant circuit 10 is coupled with the resonant inductor $L_{B2}$ of the second phase resonant circuit B2 of the second N-phase resonant circuit 20. At this point, the resonant inductor $L_{A1}$ is the first resonant inductor and the resonant inductor $L_{B1}$ is the second resonant inductor. For another example, a resonant inductor $L_{A2}$ of the second phase resonant circuit A2 of the first N-phase resonant circuit 10 is coupled with a resonant inductor $L_{B2}$ of the second phase resonant circuit B2 of the second N-phase resonant circuit 20. At this point, the resonant inductor $L_{A2}$ is the first resonant inductor and the resonant inductor $L_{B1}$ is the second resonant inductor.

In addition, in this embodiment, the first N-phase resonant circuit 10 and the second N-phase resonant circuit 20 are coupled only by one respective resonant inductor, so the structure is simpler and easy to expand. Furthermore, the complexity of control strategy can be reduced to avoid oscillation and instability.

In an embodiment, if N is an even number, then the resonant inductors in the first N-phase resonant circuit may be coupled with the resonant inductors in the second N-phase resonant circuit in one-to-one correspondence.

Taking the structure shown in FIG. 1 as an example, specifically, on the premise that the resonant inductor $L_{AN}$ of the Nth phase resonant circuit AN of the first N-phase resonant circuit 10 is coupled with the resonant inductor $L_{B1}$ of the first phase resonant circuit B1 of the second N-phase resonant circuit 20, the resonant inductor $L_{A1}$ of the first phase resonant circuit A1 of the first N-phase resonant circuit 10 is coupled with the resonant inductor $L_{B2}$ of the second phase resonant circuit B2 of the second N-phase resonant circuit 20, and the resonant inductor $L_{A2}$ of the second phase resonant circuit A2 of the first N-phase resonant circuit 10 is coupled with the resonant inductor $L_{BN}$ of the Nth phase resonant circuit BN of the second N-phase resonant circuit 20, and so on. That is, the resonant inductors in the first N-phase resonant circuit 10 are all coupled with the resonant inductors in the second N-phase resonant circuit 20, and each resonant inductor is coupled once. Meanwhile, any two resonant inductors may be coupled as long as they are coupled for once. For example, alternatively, on the premise that the resonant inductor $L_{AN}$ of the Nth phase resonant circuit AN of the first N-phase resonant circuit 10 is coupled with the resonant inductor $L_{B1}$ of the first phase resonant circuit B1 of the second N-phase resonant circuit 20, the resonant inductor $L_{A2}$ of the second phase resonant circuit A2 of the first N-phase resonant circuit 10 may be coupled with the resonant inductor $L_{B2}$ of the second phase resonant circuit B2 of the second N-phase resonant circuit 20, and the resonant inductor $L_{A1}$ of the first phase resonant circuit A1 of the first N-phase resonant circuit 10 may be coupled with the resonant inductor $L_{BN}$ of the Nth phase resonant circuit BN of the second N-phase resonant circuit 20, and so on. In this way, the current sharing of the output currents of the first N-phase resonant circuit 10 and the second N-phase resonant circuit 20 can be better achieved.

In another embodiment, if N is an even number, then (N−1) resonant inductors in the first N-phase resonant circuit may be coupled with (N−1) resonant inductors in the second N-phase resonant circuit in one-to-one correspondence.

That is, N−1 resonant inductors are randomly selected from the N resonant inductors of the first N-phase resonant circuit, and N−1 resonant inductors are randomly selected from the N resonant inductors of the second N-phase resonant circuit, and the selected resonant inductors are coupled in one-to-one correspondence.

Figure 2:
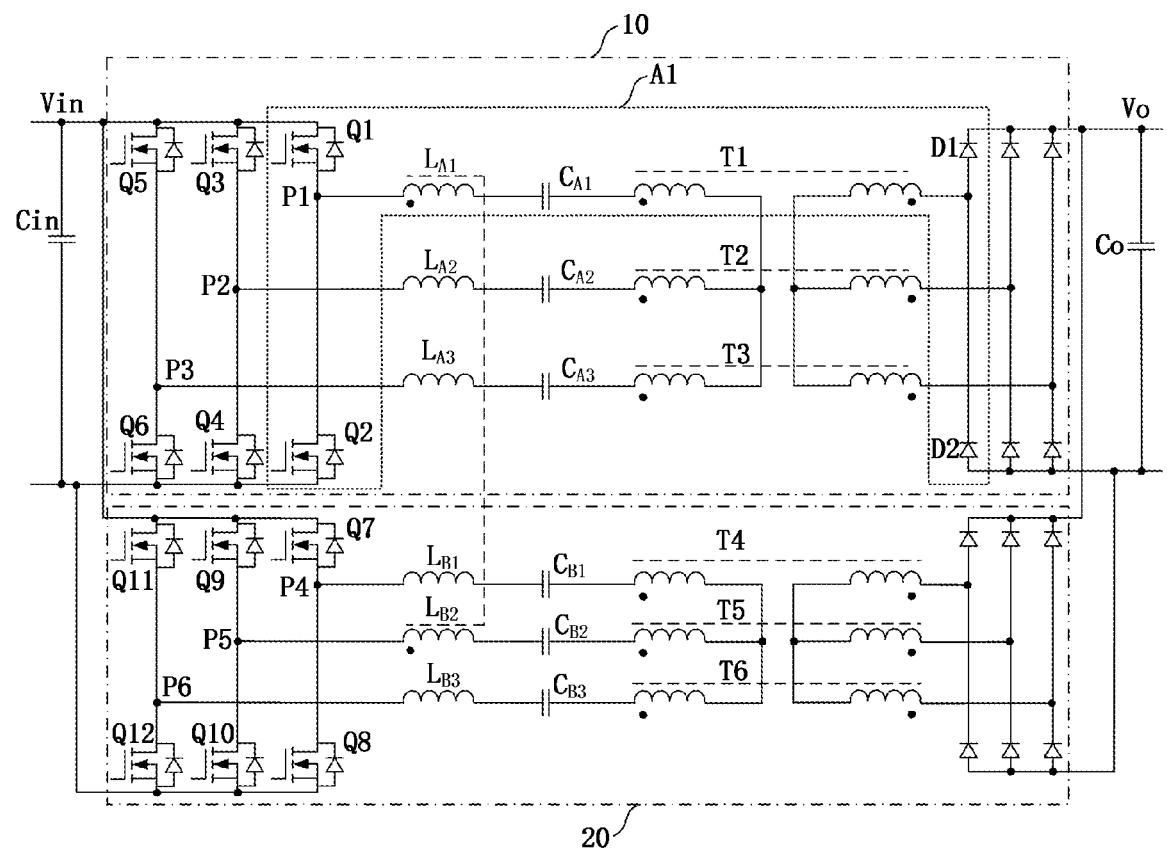
FIG. 2 is a schematic view of the circuit structure of the multi-path resonant circuit according to the embodiment of the present application.

The structure shown in FIG. 1 is still taken as an example. Specifically, on the premise that the resonant inductor $L_{AN}$ of the Nth phase resonant circuit AN of the first N-phase resonant circuit 10 is coupled with the resonant inductor $L_{B1}$ of the first phase resonant circuit B1 of the second N-phase resonant circuit 20, the resonant inductor $L_{A1}$ of the first phase resonant circuit A1 of the first N-phase resonant circuit 10 is coupled with the resonant inductor $L_{B2}$ of the second phase resonant circuit B2 of the second N-phase resonant circuit 20, and so on, and finally the resonant inductor $L_{A2}$ of the second phase resonant circuit A2 of the first N-phase resonant circuit 10 and the resonant inductor $L_{BN}$ of the Nth phase resonant circuit BN of the second N-phase resonant circuit 20 are left uncoupled. That is, among the resonant inductors of the first N-phase resonant circuit 10, all the other resonant inductors except for the resonant inductor $L_{A2}$ are coupled; and among the resonant inductors of the second N-phase resonant circuit 20, all the other resonant inductors except for the resonant inductor $L_{BN}$ are coupled, and each resonant inductor is coupled once. Similarly, the current sharing of the output currents of the first N-phase resonant circuit 10 and the second N-phase resonant circuit 20 can be better achieved. FIG. 2 illustrates a structure of the first N-phase resonant circuit 10 and the second N-phase resonant circuit 20, and in this embodiment, N=3 is taken as an example.

As shown in FIG. 2, the first N-phase resonant circuit 10 and the second N-phase resonant circuit 20 each comprise a 3-phase resonant circuit. Each phase resonant circuit comprises a bridge arm, a resonant inductor, a resonant capacitor, an isolation transformer and two diodes. For example, the first phase resonant circuit A1 of the first N-phase resonant circuit 10 comprises a first switch tube Q1, a second switch tube Q2, a resonant inductor $L_{A1}$, a resonant capacitor $C_{A1}$, an isolation transformer T1, a first diode D1 and a second diode D2. The first switch tube Q1 and the second switch tube Q2 form a bridge arm, the midpoint of which is P1, the first switch tube Q1 forms the upper bridge arm of the bridge arm and the second switch tube Q2 forms the lower bridge arm of the bridge arm.

In this embodiment, by coupling the resonant inductor $L_{A1}$ of the first phase resonant circuit A1 in the first N-phase resonant circuit 10 with the resonant inductor $L_{B2}$ of the second phase resonant circuit B2 in the second N-phase resonant circuit 20, the current sharing between the output current of the first phase resonant circuit A1 in the first N-phase resonant circuit 10 and the output current of the second phase resonant circuit B2 in the second N-phase resonant circuit 20 is achieved, and then, the current sharing of the output currents of the first phase resonant circuit A1, the second phase resonant circuit A2 and the third phase resonant circuit A3 in the first N-phase resonant circuit 10 as well as the first phase resonant circuit B1, the second phase resonant circuit B2 and the third phase resonant circuit B3 in the second N-phase resonant circuit 20 can be achieved.

In an embodiment, the multi-path resonant circuit further comprises a controller, and the controller is connected with the switches in each bridge arm of the N-phase resonant circuit. Specifically, the controller is used to output a first set of driving signals to drive the switch tube in the upper bridge arm of each bridge arm in the N-phase resonant circuit to be turned on and turned off, and output a second set of driving signals complementary to the first set of driving signals to drive the switch tube in the lower bridge arm of each bridge arm in the N-phase resonant circuit to be turned on and turned off, so that the fundamental wave of the midpoint voltage of each bridge arm in the N-phase resonant circuit has the same phase as the corresponding first set of driving signals.

The circuit structure shown in FIG. 2 is taken as an example for illustration. The controller (not shown in the figure) is connected with the switch tubes in each bridge arm of the N-phase resonant circuit. For example, the controller is connected with the first switch tube Q1 and the second switch tube Q2 in the bridge arm of the first N-phase resonant circuit, and both the first switch tube Q1 and the second switch tube Q2 are controlled by the controller.

Figure 3:
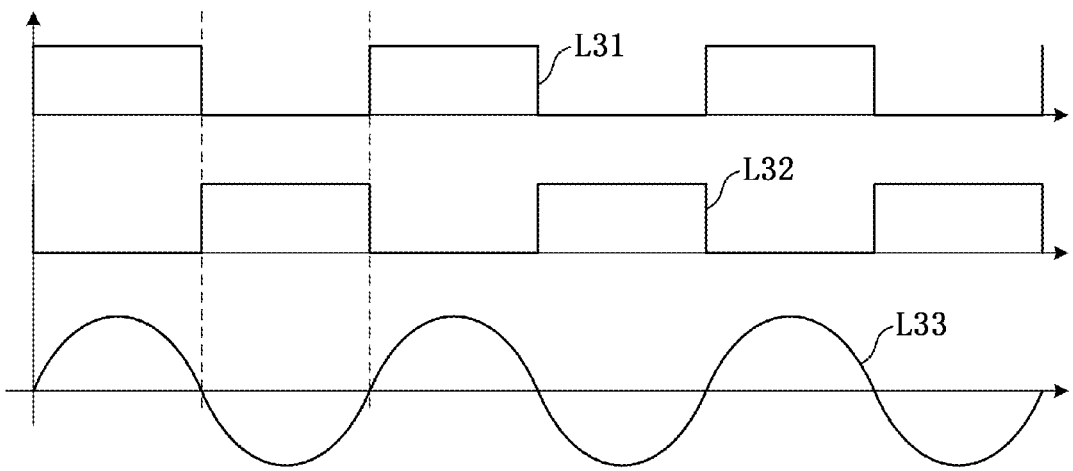
FIG. 3 is a schematic view of driving signals of the multi-path resonant circuit according to the embodiment of the present application.

Please refer to FIG. 3 together, in which a curve L31 is a driving signal of the first switch tube Q1; a curve L32 is a driving signal of the second switch tube Q2; and a curve L33 is the fundamental wave of the voltage at the midpoint P1 of the bridge arm.

Specifically, the controller outputs a driving signal (corresponding to the first set of driving signals at this point as shown by the curve L31) to drive the first switch tube Q1 of the upper bridge arm of the bridge arm in the first N-phase resonant circuit to be turned on and turned off. The first switch tube Q1 is turned on in the high-level period of the curve L31 and turned off in the low-level period of the curve L31. The controller further outputs another driving signal (corresponding to the second set of driving signals at this point as shown by the curve L32) to drive the second switch tube Q2 of the lower bridge arm of the bridge arm in the first N-phase resonant circuit to be turned on and turned off. The second switch tube Q2 is turned on in the high-level period of the curve L32 and turned off in the low-level period of the curve L32. Meanwhile, the phases of the curve L31 and the curve L32 are complementary, that is, the phases of the first set of driving signals and the second set of driving signals are complementary. In this case, as shown by the curve L33, the phase of the fundamental wave of the voltage at the midpoint P1 of the bridge arm is the same as that of the first set of driving signals. In other words, by controlling the switch tubes in each bridge arm to be turned on and turned off by the controller, the phase of the fundamental wave of the voltage at the midpoint of each bridge arm can be controlled.

In an embodiment, the first resonant inductor and the second resonant inductor are coupled to form a coupling inductor. The coupling inductor comprises a magnetic core, a winding of the first resonant inductor and a winding of the second resonant inductor. The magnetic core comprises two side posts and a center post arranged between the two side posts, and the winding of the first resonant inductor and the winding of the second resonant inductor are respectively wound on the two side posts of the magnetic core.

In an embodiment, the magnetic core is made of a ferrite material, and the two side posts and the center post are all provided with an air gap.

The structure of the multi-path resonant circuit shown in FIG. 1 is taken as an example for illustration. At this point, the resonant inductor $L_{AN}$ is the first resonant inductor and the resonant inductor L K is the second resonant inductor.

Figure 4:
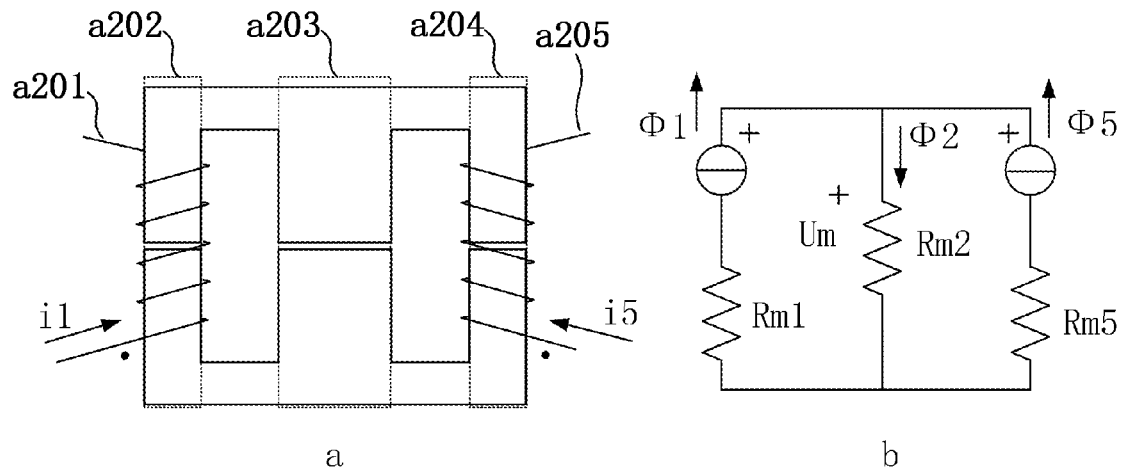
FIG. 4 is a schematic structural diagram of the coupling between a first resonant inductor and a second resonant inductor according to the embodiment of the present application.

Referring to FIG. 2 and FIG. 4 together, as shown in part a of FIG. 4, a winding a201 of the first resonant inductor is wound around a side post a202 of the magnetic core, a winding a205 of the second resonant inductor is wound around a side post a204 of the magnetic core, and a center post a203 of the magnetic core is arranged between the side post a202 and the side post a204. The current i1 of the winding a201 of the first resonant inductor flows in from the homonymous end thereof, and the current i5 of the winding a205 of the second resonant inductor flows in from the homonymous end thereof.

There is a broken part in each of the side post a202, the center post a203 and the side post a204, and the broken part is the air gap. The desired inductance can be obtained by leaving an air gap in each of the side post a202 and the side post a204. In order to realize magnetic coupling between the first resonant inductor and the second resonant inductor, it is necessary to arrange high magnetic resistance on the common magnetic flux path of the two resonant inductors, so the center post a203 also needs to be provided with an air gap.

It shall be noted that in other embodiments, the magnetic core may also be made of other materials, and no specific limitation is made thereto in the embodiments of the present application. For example, in an embodiment, the magnetic core is made of a magnetic powder core material, and no air gap may be provided.

In addition, because the phase difference between the current i1 and the current i5 is 180°, although both the current i1 and the current i5 flow in from the homonymous ends in terms of nomenclature, in practical operation, the heteronymous ends are coupled and the magnetic flux flow direction is embodied in the form of heteronymous end coupling.

Meanwhile, in this embodiment, the winding of the first resonant inductor and the winding of the second resonant inductor are wound on the two side posts of the magnetic core as an example. In other embodiments, other winding methods may also be adopted, and no specific limitation is made thereto in the embodiments of the present application as long as the magnetic coupling between the first resonant inductor and the second resonant inductor is achieved.

Each magnetic flux in the structure of part a of FIG. 4 is as shown in part b of FIG. 4, and as shown in part b of FIG. 4, it is known from the above description that each magnetic post (including the side post a202, the center post a203 and the side post a204) is provided with an air gap in order to form magnetic resistance large enough. Therefore, in the representation of the magnetic path, Rm1, Rm2 and Rm5 respectively represent the magnetic resistance of the three magnetic posts. Φ1 and Φ5 respectively represent equivalent magnetic flux current sources formed by volt seconds on the winding a201 of the first resonant inductor and the winding a205 of the second resonant inductor. As can be seen from the flow direction of the magnetic flux shown in part b of FIG. 4, the magnetic flux is in a superimposed state at the center post a203. If current sharing is not achieved between the two resonant inductors, they may interact with each other through the change of magnetic potential of the center post a203 so as to be coupled, so that the first resonant inductor and the second resonant inductor coupled at the heteronymous ends achieve the current sharing function.

As shall be appreciated, this embodiment only illustrates a mode in which the first resonant inductor is coupled with the second resonant inductor, while other coupling modes may also be adopted in other embodiments, and no limitation is made thereto in the embodiments of the present application.

For example, in another embodiment, a transformer may be added to realize the coupling between the first resonant inductor and the second resonant inductor.

Figure 5:
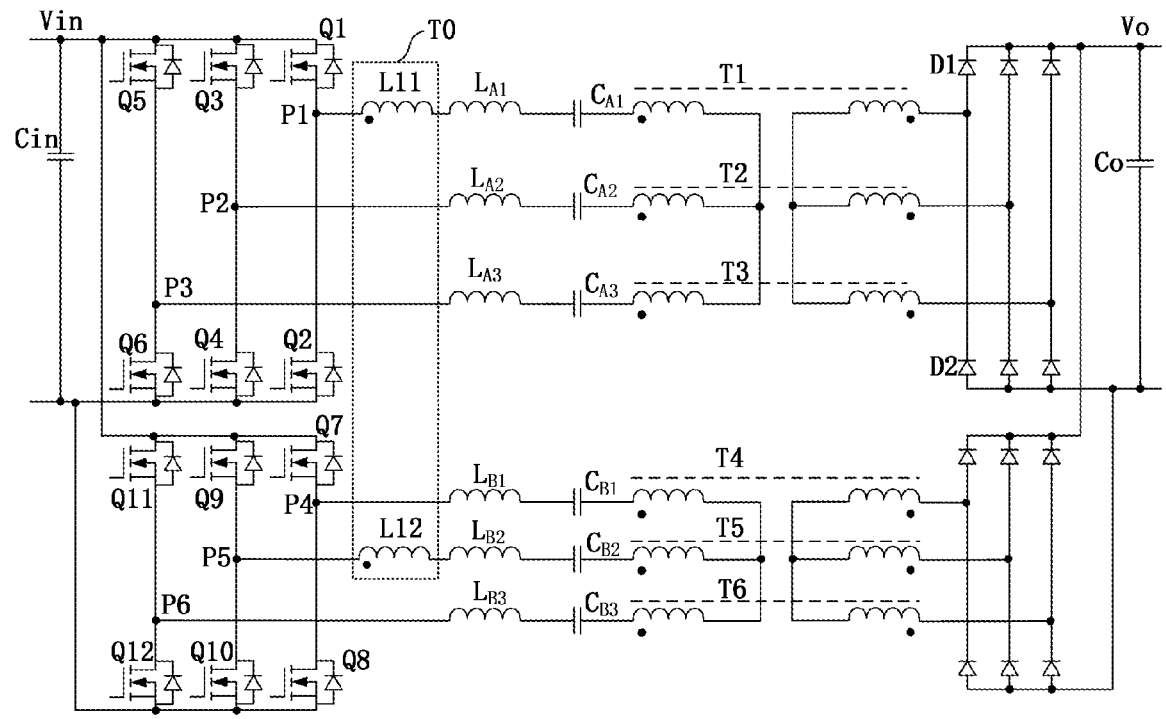
FIG. 5 is a schematic view of the circuit structure of a multi-path resonant circuit according to another embodiment of the present application.

As shown in FIG. 5, the multi-path resonant circuit further comprises a transformer TO, which comprises a first inductor L11 and a second inductor L12. The first inductor L11 is connected between the midpoint P1 of the bridge arm in the resonant circuit corresponding to the first resonant inductor (which is the resonant inductor $L_{A1}$ at this point) and the first resonant inductor, and the second inductor L12 is connected between a midpoint P5 of the bridge arm in the resonant circuit corresponding to the second resonant inductor (which is the resonant inductor $L_{B2}$ at this point) and the second resonant inductor.

In this embodiment, the transformer TO is a strong coupling transformer, which can also realize the coupling between the first resonant inductor and the second resonant inductor so as to achieve the current sharing of the output currents of the first N-phase resonant circuit and the second N-phase resonant circuit.

In an embodiment, the at least two N-phase resonant circuits further comprise a third N-phase resonant circuit. A third resonant inductor in any phase resonant circuit of the third N-phase resonant circuit is coupled with a fourth resonant inductor in the resonant circuit with uncoupled resonant inductance in the first N-phase resonant circuit, or the third resonant inductor is coupled with a fifth resonant inductor in a resonant circuit with uncoupled resonant inductance in the second N-phase resonant circuit.

Figure 6:
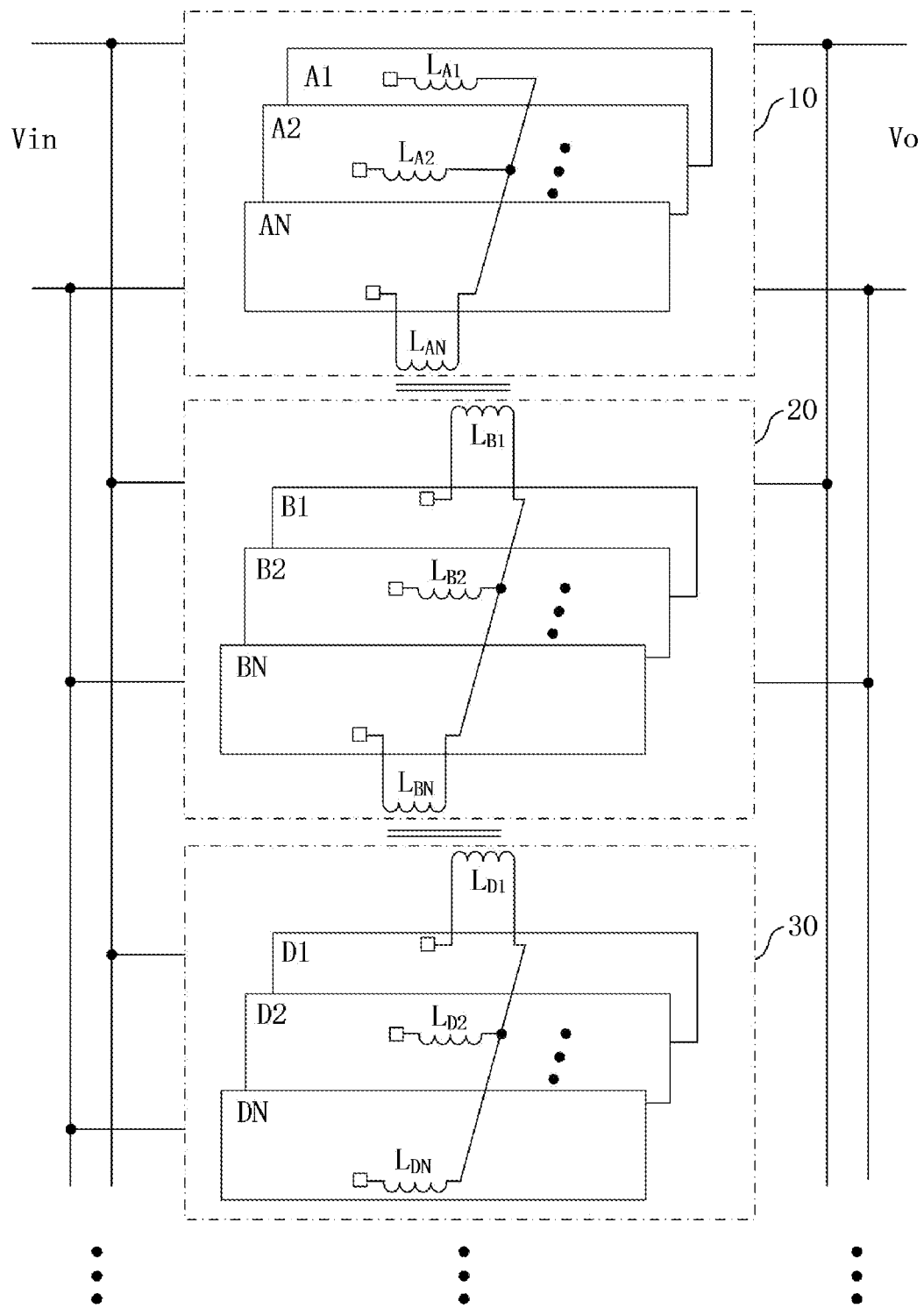
FIG. 6 is a schematic structural diagram of a multi-path resonant circuit provided according to another embodiment of the present application.

Specifically, referring to FIG. 6, the at least two N-phase resonant circuits further comprise a third N-phase resonant circuit 30. A resonant inductor $L_{D1}$ of the first phase resonant circuit D1 in the third N-phase resonant circuit 30 is coupled with the resonant inductor $L_{BN}$ of the Nth phase resonant circuit BN with uncoupled resonant inductance in the second N-phase resonant circuit 20 to realize current sharing between the output current of the second N-phase resonant circuit 20 and the output current of the third N-phase resonant circuit 30. At this point, the resonant inductor $L_{D1}$ is the third resonant inductor and the resonant inductor $L_{BN}$ is the fifth resonant inductor.

As shall be appreciated, in this embodiment, the coupling of the resonant inductor $L_{D1}$ and the resonant inductor $L_{BN}$ is taken as an example, while in other embodiments, we only need to find out an uncoupled resonant inductor in the first N-phase resonant circuit 10 and the second N-phase resonant circuit 20 and make it coupled with any resonant inductor in the third N-phase resonant circuit 30, and no specific limitation is made thereto in the embodiments of the present application. For example, in an embodiment, the resonant inductor $L_{D2}$ may be coupled with the resonant inductor $L_{B2}$, and in another embodiment, the resonant inductor $L_{DN}$ may be coupled with the resonant inductor $L_{BN}$.

Meanwhile, a fourth N-phase resonant circuit and a fifth N-phase resonant circuit or the like may be continuously added with reference to the way of adding the third N-phase resonant circuit. The specific implementation is the same as the way of adding the third N-phase resonant circuit, and this is within the scope easily appreciated by those skilled in the art and thus will not be further described herein. In addition, since the method of current sharing is simpler, it is easy to expand.

For example, in an embodiment, the multi-path resonant circuit further comprises a fourth N-phase resonant circuit, then a resonant inductor of any phase resonant circuit in the fourth N-phase resonant circuit may be coupled with the resonant inductor $L_{B2}$ shown in FIG. 4 to realize current sharing of the output currents of the fourth N-phase resonant circuit and the second N-phase resonant circuit 20.

In addition, in practical application, it can provide great advantages in the layout of PCB. In an embodiment, please refer to FIG. 7, which is a schematic view of the layout of the PCB for the first N-phase resonant circuit 10 and the second N-phase resonant circuit 20 provided according to the embodiments of the present application, wherein N=3.

Figure 7:
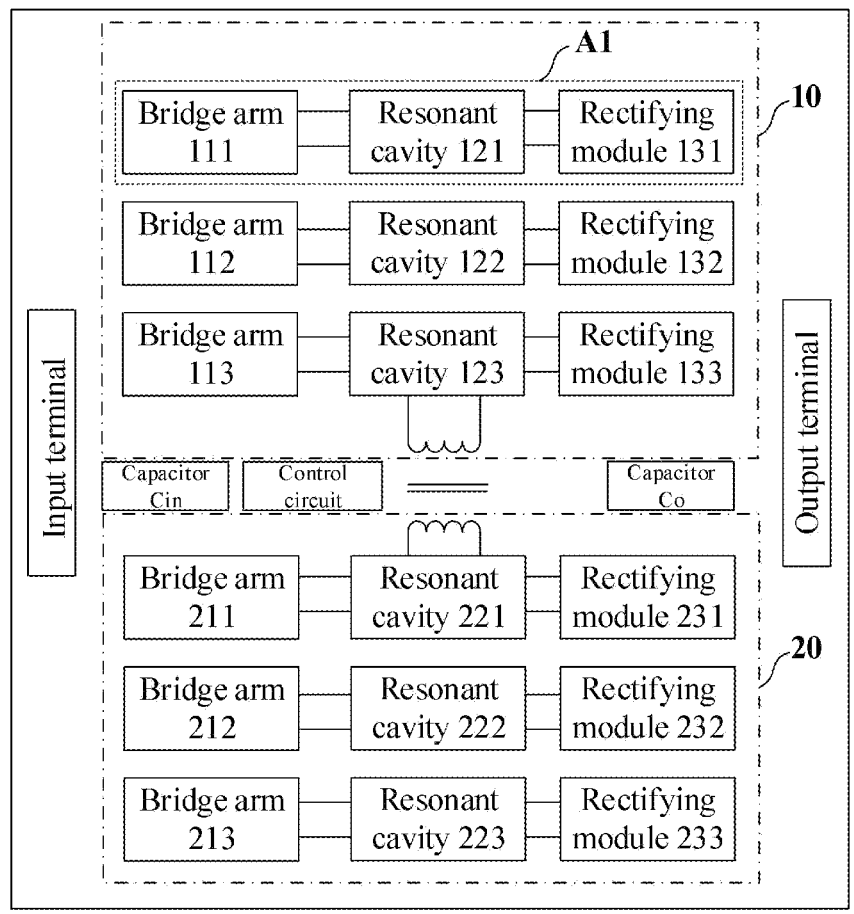
FIG. 7 is a schematic structural diagram of the PCB layout of the multi-path resonant circuit according to the embodiment of the present application.

Referring to FIG. 2 and FIG. 7 together, each phase resonant circuit comprises a bridge arm, a resonant cavity and a rectifying module. The bridge arm comprises an upper bridge arm and a lower bridge arm, the upper bridge arm and the lower bridge arm each comprise a switch tube, the resonant cavity comprises a resonant inductor, a resonant capacitor and an isolation transformer, and the rectifying module comprises two diodes. For example, the first phase resonant circuit A1 of the first N-phase resonant circuit 10 comprises a bridge arm 111, a resonant cavity 121 and a rectifying module 131. The upper bridge arm of the bridge arm 111 comprises a first switch tube Q1, and the lower bridge arm of the bridge arm 111 comprises a second switch tube Q2. The resonant cavity 121 comprises a resonant inductor $L_{A1}$, a resonant capacitor $C_{A1}$, and an isolation transformer T1. The rectifying module 131 comprises a first diode D1 and a second diode D2.

In this embodiment, the layout between the first N-phase resonant circuit 10 and the second N-phase resonant circuit 20 is compact and the area occupied by the circuits is small, so that the material loss is small and it is beneficial for realizing the current sharing function at a low cost and providing strong practicability.

In an embodiment, the phase difference between the fundamental wave of the bridge arm midpoint voltage in a resonant circuit corresponding to the first resonant inductor and the fundamental wave of the bridge arm midpoint voltage in a resonant circuit corresponding to the second resonant inductor is k*180°, and k is an integer. The fundamental wave refers to the sine wave component whose period equal to the longest period of the complex periodic oscillation. Generally speaking, the fundamental wave is a sine wave with the same frequency as the switching frequency in the corresponding bridge arm.

The circuit structure shown in FIG. 2 is taken as an example for illustration. In this embodiment, the resonant inductor $L_{A1}$ of the first phase resonant circuit A1 in the first N-phase resonant circuit 10 is coupled with the resonant inductor $L_{B2}$ of the second phase resonant circuit B2 in the second N-phase resonant circuit 20, so that the resonant inductor $L_{A1}$ corresponds to the first resonant inductor and the resonant inductor $L_{B2}$ corresponds to the second resonant inductor. That is, the resonant circuit corresponding to the first resonant inductor is the first phase resonant circuit A1 in the first N-phase resonant circuit 10, and the resonant circuit corresponding to the second resonant inductor is the second phase resonant circuit B2 in the second N-phase resonant circuit 20. The midpoint of the bridge arm in the resonant circuit corresponding to the first resonant inductor is the midpoint P1 of the bridge arm of the first phase resonant circuit A1 in the first N-phase resonant circuit 10, and the midpoint of the bridge arm in the resonant circuit corresponding to the second resonant inductor is the midpoint P4 of the bridge arm of the second phase resonant circuit B2 in the second N-phase resonant circuit 20. The fundamental wave of the bridge arm midpoint voltage in the resonant circuit corresponding to the first resonant inductor is the fundamental wave of the voltage on the bridge arm midpoint P1 (which is labeled as the first fundamental wave), and the fundamental wave of the bridge arm midpoint voltage in the resonant circuit corresponding to the second resonant inductor is the fundamental wave of the voltage on the bridge arm midpoint P2 (which is labeled as the second fundamental wave).

By configuring the phase difference between the first fundamental wave and the second fundamental wave to be k*180°, it is possible to ensure that there are driving signals with a phase difference of k*180° among different N-phase resonant circuits while driving the N-phase resonant circuits at the same frequency. The driving signals are the signals for driving the switch tubes in the bridge arm so as to realize the coupling between different resonant inductors. For example, in this embodiment, the phase difference between the first fundamental wave and the second fundamental wave is k*180°, then the phase difference between the driving signal of the bridge arm of the first phase resonant circuit A1 in the first N-phase resonant circuit 10 and the driving signal of the bridge arm of the second phase resonant circuit B2 in the second N-phase resonant circuit 20 is k*180°. At this point, the resonant inductor $L_{A1}$ may be coupled with the resonant inductor $L_{B2}$ to achieve current sharing.

Figure 8:
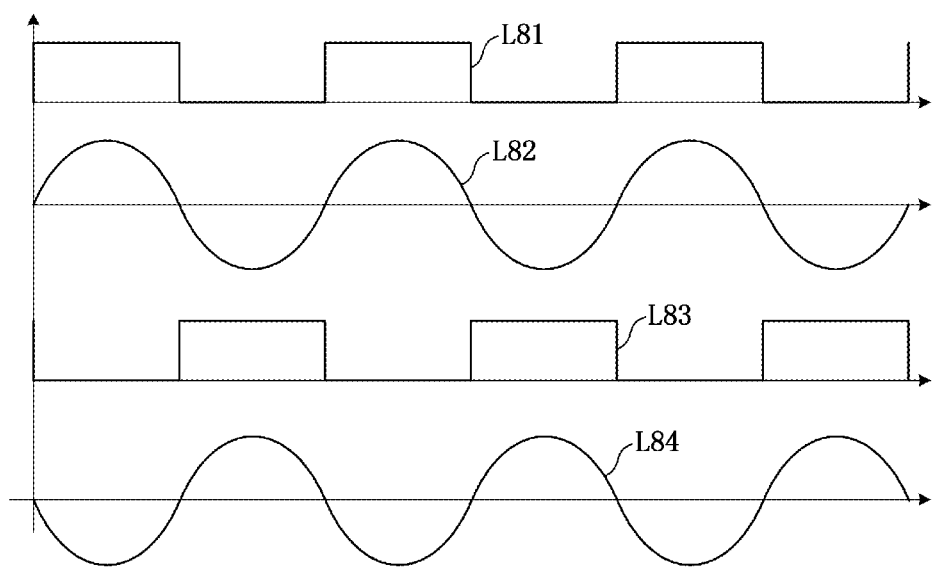
FIG. 8 is a schematic view of driving signals of a multi-path resonant circuit according to another embodiment of the present application.

Referring to FIG. 2 and FIG. 8 together, a curve L81 is a schematic view of a driving signal of the first switch tube Q1, which corresponds to the driving signal of the bridge arm of the first phase resonant circuit A1 in the first N-phase resonant circuit 10; a curve L82 is a schematic view of the first fundamental wave; a curve L83 is a schematic view of a driving signal of a ninth switch tube Q9, which corresponds to the driving signal of the bridge arm of the second phase resonant circuit B2 in the second N-phase resonant circuit 20; and a curve L84 is a schematic view of the second fundamental wave, wherein K=1.

Referring to FIG. 8, as can be known from the curve L82 and the curve L84, the phase difference between the first fundamental wave and the second fundamental wave is 180°. At this point, the phase difference between the driving signal of the first switch tube Q1 and the driving signal of the ninth switch tube Q9 is also 180°, and then the resonant inductor $L_{A1}$ and the resonant inductor $L_{B2}$ may be coupled to achieve current sharing.

In an embodiment, the phase difference between the fundamental wave of the bridge arm midpoint voltage of the first phase resonant circuit in the N-phase resonant circuit and the fundamental wave of the bridge arm midpoint voltage of the second phase resonant circuit in the N-phase resonant circuit is 360°/N.

Furthermore, if the fundamental wave of the bridge arm midpoint voltage of the first phase resonant circuit in the first N-phase resonant circuit and the fundamental wave of the bridge arm midpoint voltage of the first phase resonant circuit in the second N-phase resonant circuit are collocated fundamental waves, then the phase difference between the fundamental wave of the bridge arm midpoint voltage of the first phase resonant circuit in the first N-phase resonant circuit and the fundamental wave of the bridge arm midpoint voltage of the first phase resonant circuit in the second N-phase resonant circuit is 180-360°/N.

The collocated fundamental waves refer to the fundamental waves of the bridge arm midpoint voltage of the same phase resonant circuits for different N-phase resonant circuits. For example, the fundamental wave of the bridge arm midpoint voltage of the first phase resonant circuit of the first N-phase resonant circuit and the fundamental wave of the bridge arm midpoint voltage of the first phase resonant circuit of the second N-phase resonant circuit are collocated fundamental waves, and the circuit structure of the first phase resonant circuit of the first N-phase resonant circuit is the same as that of the first phase resonant circuit of the second N-phase resonant circuit. For another example, the fundamental wave of the bridge arm midpoint voltage of the second phase resonant circuit of the first N-phase resonant circuit and the fundamental wave of the bridge arm midpoint voltage of the second phase resonant circuit of the second N-phase resonant circuit are collocated fundamental waves, and the circuit structure of the second phase resonant circuit of the first N-phase resonant circuit is the same as that of the second phase resonant circuit of the second N-phase resonant circuit.

Specifically, taking N=3 as an example, the phase difference between the fundamental wave of the bridge arm midpoint voltage of the first phase resonant circuit and the fundamental wave of the bridge arm midpoint voltage of the second phase resonant circuit is 120°. The phase difference between the fundamental wave of the bridge arm midpoint voltage of the first phase resonant circuit and the fundamental wave of the bridge arm midpoint voltage of the third phase resonant circuit is 240° or −120°. It is assumed that the fundamental wave of the bridge arm midpoint voltage of the first phase resonant circuit in the first N-phase resonant circuit is 0° at the initial phase, then the fundamental wave of the bridge arm midpoint voltage of the first phase resonant circuit in the second N-phase resonant circuit is 60° at the initial phase to meet the condition that the phase difference between the fundamental wave of the bridge arm midpoint voltage of the first phase resonant circuit in the first N-phase resonant circuit and the fundamental wave of the bridge arm midpoint voltage of the first phase resonant circuit in the second N-phase resonant circuit is 180-360°/N.

Furthermore, as can be known from the above embodiments, the phase of each fundamental wave is the same as the phase of the driving signal of the switch tube of the upper bridge arm, and thus the driving signal of the switch tube of each upper bridge arm can be obtained. The circuit structure shown in FIG. 2 is still taken as an example for illustration, and the driving signals at this point are as shown in FIG. 9.

Figure 9:
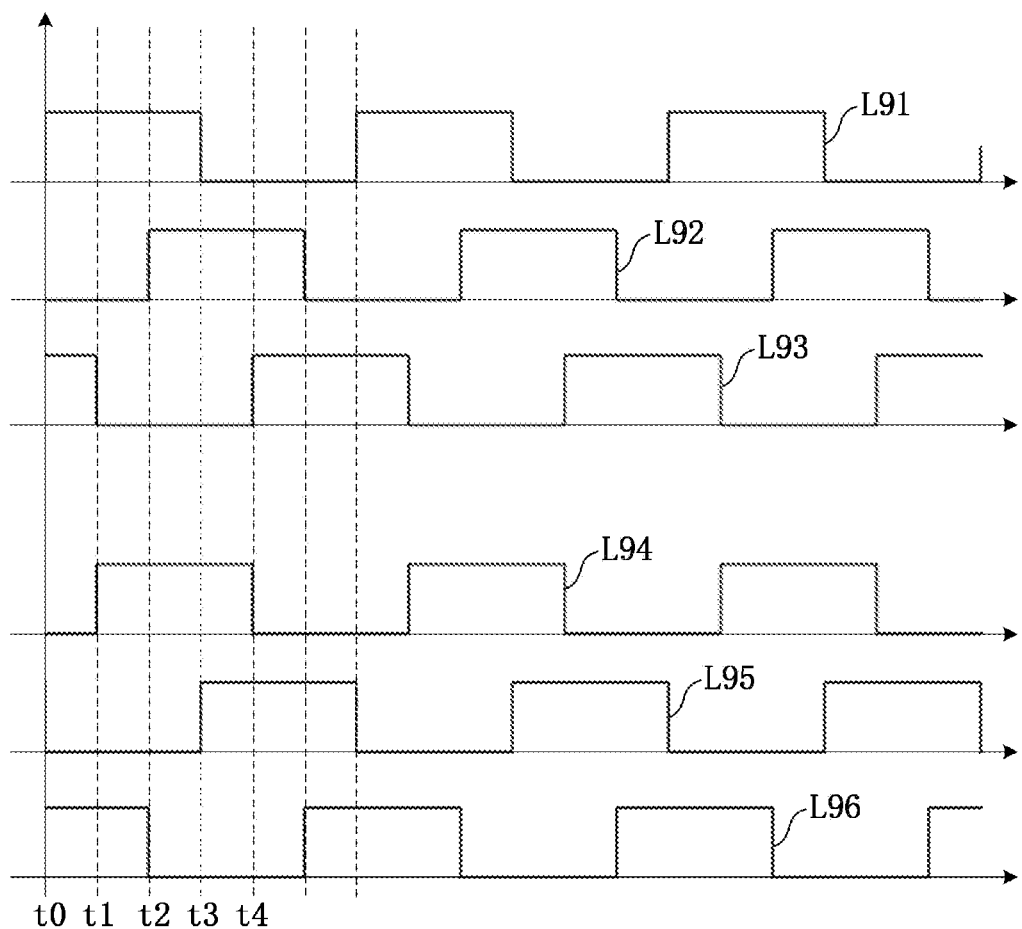
FIG. 9 is a schematic view of driving signals of a multi-path resonant circuit according to yet another embodiment of the present application.

Please refer to FIG. 2 and FIG. 9 together. As shown in FIG. 9, a curve L91 is a driving signal of the first switch tube Q1; a curve L92 is a driving signal of a third switch tube Q3; a curve L93 is a driving signal of a fifth switch tube Q5; a curve L94 is a driving signal of a seventh switch tube Q7; a curve L95 is a driving signal of the ninth switch tube Q9; and a curve L96 is a driving signal of an eleventh switch tube Q11.

Specifically, the first switch tube Q1 starts to be driven to be turned on at the time of t0, the third switch tube Q3 is turned on at the time of t2, and the fifth switch tube Q5 starts to be turned on at the time of t4. The phase difference between the time of t0 and the time of t2 is 120°, and the phase difference between the time of t2 and the time of t4 is 120°. That is, the phase difference between the driving signal of the first switch tube Q1 and the driving signal of the third switch tube Q3 is 120°, and the phase difference between the driving signal of the third switch tube Q3 and the driving signal of the fifth switch tube Q5 is 120°. Furthermore, since one cycle is 360°, the phase difference between the driving signal of the first switch tube Q1 and the driving signal of the fifth switch tube Q5 is −120°. That is, for the first N-phase resonant circuit 10, the phase difference between the fundamental wave (of which the phase is 0°) of the bridge arm midpoint voltage of the resonant circuit A1 and the fundamental wave (of which the phase is 120°) of the bridge arm midpoint voltage of the resonant circuit A2 is 120°. The phase difference between the fundamental wave (of which the phase is 0°) of the bridge arm midpoint voltage of the resonant circuit A1 and the fundamental wave (of which the phase is 240°) of the bridge arm midpoint voltage of the resonant circuit A3 is −120°. The phase difference between the fundamental wave (of which the phase is 120°) of the bridge arm midpoint voltage of the resonant circuit A2 and the fundamental wave (of which the phase is 240°) of the bridge arm midpoint voltage of the resonant circuit A3 is 120°.

Similarly, for the second N-phase resonant circuit 20, the phase difference between the fundamental wave (of which the phase is 60°) of the bridge arm midpoint voltage of the resonant circuit B1 and the fundamental wave (of which the phase is 180°) of the bridge arm midpoint voltage of the resonant circuit B2 is 120°. The phase difference between the fundamental wave (of which the phase is 60°) of the bridge arm midpoint voltage of the resonant circuit B1 and the fundamental wave (of which the phase is 300°) of the bridge arm midpoint voltage of the resonant circuit B3 is −120°. The phase difference between the fundamental wave (of which the phase is 180°) of the bridge arm midpoint voltage of the resonant circuit B2 and the fundamental wave (of which the phase is 300°) of the bridge arm midpoint voltage of the resonant circuit B3 is 120°.

Then, driving signals with a phase difference of 180° can always be found for two parallel N-phase resonant circuits. For example, the phase difference between the driving signal of the first switch tube Q1 and a driving signal of the eleventh switch tube Q11 is 180°. The advantages of this arrangement are as follows: on the one hand, for the odd-numbered N-phase resonant circuit with N greater than or equal to 3, it helps to reduce the output ripple thereof; and on the other hand, the internal circulation of common-mode noise between two parallel N-phase resonant circuits can be realized to reduce external noise emission.

However, it shall be noted that this is not the only arrangement mode. For example, two parallel N-phase resonant circuits may be enabled to work completely at the same phase and at the same frequency, so all the phase difference between the two circuits is always 0° (i.e., corresponding to the case where K is an even number, for example, K=0). At this point, only an inductive coupling mode opposite to the previous mode is required. For example, when K is an odd number, two resonant inductors are coupled at the homonymous ends, and when K is an even number, two resonant inductors are coupled at heteronymous ends.

The following analysis and explanation are made with reference to the time period between the time of t1 and the time of t2.

Figure 10:
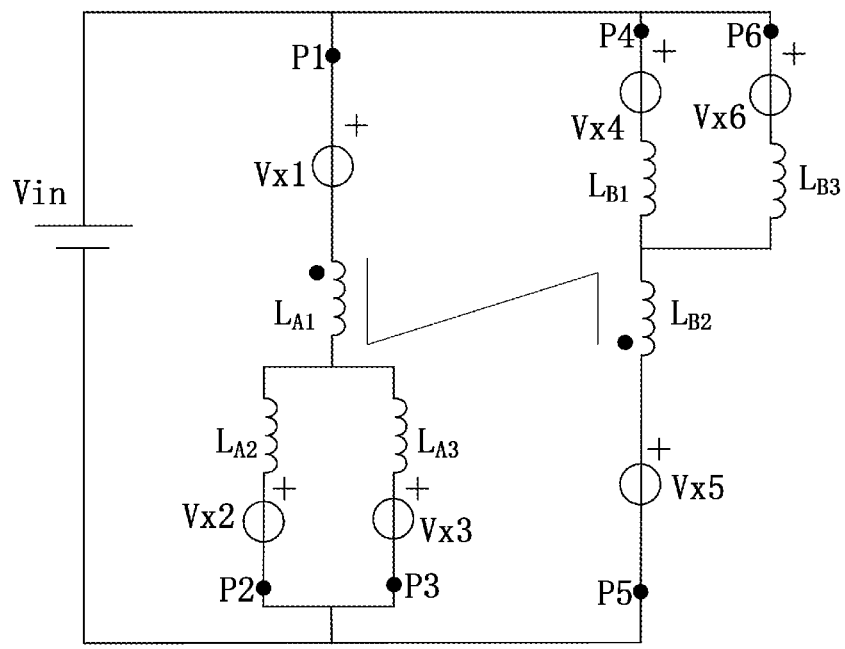
FIG. 10 is a schematic view of the circuit structure of a multi-path resonant circuit according to yet another embodiment of the present application.

During this time period, the first switch tube Q1, the fourth switch tube Q4, the sixth switch tube Q6, the seventh switch tube Q7, the tenth switch tube Q10 and the twelfth switch tube Q12 are turned on, and the other switch tubes are turned off, so the circuit structure shown in FIG. 2 may be equivalent to that shown in FIG. 10.

As shown in FIG. 10, Vx1 is an equivalent voltage source composed of the resonant capacitor $C_{A1}$ and the isolation transformer T1. Vx2 is an equivalent voltage source composed of a resonant capacitor C A2 and an isolation transformer T2. Vx3 is an equivalent voltage source composed of a resonant capacitor $C_{A3}$ and an isolation transformer T3. Vx4 is an equivalent voltage source composed of a resonant capacitor $C_{B1}$ and an isolation transformer T4. Vx5 is an equivalent voltage source composed of a resonant capacitor C B2 and an isolation transformer T5. Vx6 is an equivalent voltage source composed of a resonant capacitor $C_{B3}$ and an isolation transformer T6. Furthermore, the resonant inductor $L_{A1}$ is coupled with the resonant inductor $L_{B2}$.

Under such relationships, it can be seen that the homonymous end of the resonant inductor $L_{A1}$ is in the direction of inductance withstanding positive voltage, while the heteronymous end of the resonant inductor $L_{B2}$ is in the direction of inductance withstanding positive voltage. Therefore, after combined with the driving waveforms, the actual operation is in a relationship where heteronymous ends are coupled. By expanding the resonant inductor $L_{A1}$ and the resonant inductor $L_{B2}$ in the circuit into a coupled inductor model, it can be seen that the coupling voltage generated by mutual inductance can perform mutual voltage compensation at this point, thereby realizing current sharing between the circuits. The strength of coupling may affect the degree of current sharing. An optimized design method is to make the coupling inductance half of the self-inductance, which can achieve better current sharing effect. Under this design method, the series resonant inductance required by the resonant cavity is equal to the self-inductance minus the coupling inductance. The coupling inductance is the inductance value of two coupled resonant inductors acting on each other, the self-inductance is the inductance value of the resonant inductor itself, and the series resonant inductance is the difference between the self-inductance and the coupling inductance. For example, if the resonant inductor $L_{A1}$ is coupled with the resonant inductor $L_{B2}$, then the part of the inductance generated by the resonant inductor $L_{A1}$ that acts on the resonant inductor $L_{B2}$ is the coupling inductance $M_{A1}$ on a branch of the resonant inductor $L_{B2}$, and the inductance generated by the resonant inductor $L_{A1}$ is the self-inductance $L_1$ of the resonant inductor $L_{A1}$. The part of the inductance generated by the resonant inductor $L_{B2}$ that acts on the resonant inductor $L_{A1}$ is the coupling inductance M K on a branch of the resonant inductor $L_{A1}$, and the inductance generated by the resonant inductor $L_{B2}$ is the self-inductance $L_2$ of the resonant inductor $L_{B2}$.

Then, when the resonant inductor $L_{A1}$ and the resonant inductor $L_{B2}$ are expanded into a coupled inductor model as shown in FIG. 4, the following formulas can be obtained:

$$L_1 = \frac{N^2 \times (Rm5 + Rm2)}{Rm1 \times Rm2 + Rm1 \times Rm5 + Rm2 \times Rm5} \quad (1)$$

$$L_5 = \frac{N^2 \times (Rm1 + Rm2)}{Rm1 \times Rm2 + Rm1 \times Rm5 + Rm2 \times Rm5} \quad (2)$$

$$M_{A1} = M_{B2} = \frac{N^2 \times Rm2}{Rm1 \times Rm2 + Rm1 \times Rm5 + Rm2 \times Rm5} \quad (3)$$

$$L_{r1} = \frac{N^2 \times (Rm5 + Rm2) - N^2 \times Rm2 \times \frac{i5}{i1}}{Rm1 \times Rm2 + Rm1 \times Rm5 + Rm2 \times Rm5} \quad (4)$$

$$L_{r5} = \frac{N^2 \times (Rm5 + Rm2) - N^2 \times Rm2 \times \frac{i1}{i5}}{Rm1 \times Rm2 + Rm1 \times Rm5 + Rm2 \times Rm5} \quad (5)$$

wherein N is the number of turns of the winding a201 of the first resonant inductor or the number of turns of the winding a205 of the second resonant inductor; Lr1 is the series resonant inductance in the first phase resonant circuit A1 of the first N-phase resonant circuit; Lr5 is the series resonant inductance in the second phase resonant circuit B2 of the second N-phase resonant circuit. It can be found that the magnitude of the series resonant inductance Lr1 and the series resonant inductance Lr5 all changes with the ratio of i1 and i5. For example, for the series resonant inductance Lr1, when the current i5 is larger than the current i1, Lr1 decreases so that the current i1 can get a larger growth rate at the same voltage, and the current i1 increases and gradually approaches the current i5 so that the difference between the current i1 and the current i5 becomes smaller and smaller, and thus the current sharing between the current i1 and the current i5 can be realized.

The following is the test result of the multi-path resonant circuit provided according to the embodiments of the present application, wherein the input voltage is 400V and the output voltage is 680V. The test structure is as shown in Table 1.

TABLE 1

| | | Output current | |
|---|---|---|---|
| | | Coupled state | Uncoupled state |
| First N-phase resonant circuit | First phase | 28.62 | 20.7 |
| | Second phase | 28.3 | 20.2 |
| | Third phase | 29.6 | 21.8 |
| Second N-phase resonant circuit | First phase | 30.3 | 38.5 |
| | Second phase | 29.9 | 38.5 |
| | Third phase | 31.3 | 38.4 |

As shown in Table 1, when there is no coupled resonant inductor, that is, in the uncoupled state, the difference between the output currents of the first N-phase resonant circuit and the second N-phase resonant circuit is relatively large, which may lead to the damage of devices or the abnormality of the whole system. When there are coupled resonant inductors, that is, in the coupled state, the output currents of the first N-phase resonant circuit and the second N-phase resonant circuit are nearly equal to each other, and the current sharing effect is better, which can improve the stability of the system operation.

An embodiment of the present application further provides a resonant converter, which comprises a multi-path resonant circuit as in any of the embodiments described above.

Finally, it shall be noted that, the above embodiments are only used to illustrate the technical solutions of the present application, and are not intended to limit the present application. Under the idea of the present application, technical features in the above embodiments or different embodiments may also be combined, the steps may be implemented in any order, and many other variations in different aspects of the present application as described above are possible, and these variations are not provided in details for conciseness. Although the present application has been described in detail with reference to the foregoing embodiments, those of ordinary skill in the art shall appreciate that, the technical solutions described in the foregoing embodiments may still be modified or some of the technical features may be equivalently replaced. These modifications or replacements do not make the essence of the corresponding technical solutions deviate from the scope of the technical solutions of various embodiments of the present application.

The invention claimed is:

1. A multi-path resonant circuit, comprising: at least two paralleled N-phase resonant circuits, N being an integer greater than or equal to 3; the at least two paralleled N-phase resonant circuits comprising a first N-phase resonant circuit and a second N-phase resonant circuit; a first resonant inductor in any phase resonant circuit of the first N-phase resonant circuit being coupled with a second resonant inductor in any phase resonant circuit of the second N-phase resonant circuit, each resonant inductor is coupled at most once, wherein the at least two N-phase resonant circuits further comprise a third N-phase resonant circuit; a third resonant inductor in any phase resonant circuit of the third N-phase resonant circuit is coupled with a fourth resonant inductor in the first N-phase resonant circuit, or the third resonant inductor is coupled with a fifth resonant inductor in the second N-phase resonant circuit, the third inductor is not coupled to the first or second resonant inductor.

2. The multi-path resonant circuit according to claim 1, wherein the phase difference between the fundamental wave of the bridge arm midpoint voltage in a resonant circuit corresponding to the first resonant inductor and the fundamental wave of the bridge arm midpoint voltage in a resonant circuit corresponding to the second resonant inductor is k*180°, and k is an integer.

3. The multi-path resonant circuit according to claim 1, wherein the phase difference between the fundamental wave of the bridge arm midpoint voltage of a first phase resonant circuit in the N-phase resonant circuits and the fundamental wave of the bridge arm midpoint voltage of a second phase resonant circuit in the N-phase resonant circuits is 360°/N;

and if the fundamental wave of the bridge arm midpoint voltage of the first phase resonant circuit in the first N-phase resonant circuit and the fundamental wave of the bridge arm midpoint voltage of the first phase resonant circuit in the second N-phase resonant circuit are collocated fundamental waves, then the phase difference between the fundamental wave of the bridge arm midpoint voltage of the first phase resonant circuit in the first N-phase resonant circuit and the fundamental wave of the bridge arm midpoint voltage of the first phase resonant circuit in the second N-phase resonant circuit is 180-360°/N.

4. The multi-path resonant circuit according to claim 1, wherein the multi-path resonant circuit further comprises a controller, and the controller is connected with switch tubes in bridge arms of the N-phase resonant circuit;

the controller is configured to output a first set of driving signals to drive the switches in the upper bridge arm of each bridge arm in the N-phase resonant circuit to be turned on and turned off, and output a second set of driving signals complementary to the first set of driving signals to drive the switches in the lower bridge arm of each bridge arm in the N-phase resonant circuit to be turned on and turned off, so that the fundamental wave of the midpoint voltage of each bridge arm in the N-phase resonant circuit have the same phase as the corresponding first set of driving signals.

5. The multi-path resonant circuit according to claim 1, wherein the first resonant inductor and the second resonant inductor are coupled to form a coupled inductor;

the coupled inductor comprises a magnetic core, a winding of the first resonant inductor and a winding of the second resonant inductor;

the magnetic core comprises two side posts and a center post arranged between the two side posts, and the winding of the first resonant inductor and the winding of the second resonant inductor are respectively wound on the two side posts of the magnetic core.

6. The multi-path resonant circuit according to claim 5, wherein the magnetic core is made of a ferrite material, and the two side posts and the center post are all provided with an air gap.

7. The multi-path resonant circuit according to claim 1, wherein the multi-path resonant circuit further comprises a transformer, and the transformer comprises a first inductor and a second inductor;

the first inductor is connected between the midpoint of the bridge arm in the resonant circuit corresponding to the first resonant inductor and the first resonant inductor, and the second inductor is connected between the midpoint of the bridge arm in the resonant circuit corresponding to the second resonant inductor and the second resonant inductor.

8. The multi-path resonant circuit according to claim 1, wherein if N is an even number, then resonant inductors in the first N-phase resonant circuit and resonant inductors in the second N-phase resonant circuit are coupled in one-to-one correspondence.

9. A resonant converter, comprising a multi-path resonant circuit, wherein the multi-path resonant circuit comprises: at least two parallel N-phase resonant circuits, N being an integer greater than or equal to 3; the at least two parallel N-phase resonant circuits comprising a first N-phase resonant circuit and a second N-phase resonant circuit; a first resonant inductor in any phase resonant circuit of the first N-phase resonant circuit being coupled with a second resonant inductor in any phase resonant circuit of the second N-phase resonant circuit, each resonant inductor is coupled at most once, wherein the at least two N-phase resonant circuits further comprise a third N-phase resonant circuit; a third resonant inductor in any phase resonant circuit of the third N-phase resonant circuit is coupled with a fourth resonant inductor in the first N-phase resonant circuit, or the third resonant inductor is coupled with a fifth resonant inductor in the second N-phase resonant circuit, the third inductor is not coupled to the first or second resonant inductor.

10. The resonant converter according to claim 9, wherein the phase difference between the fundamental wave of the bridge arm midpoint voltage in a resonant circuit corresponding to the first resonant inductor and the fundamental wave of the bridge arm midpoint voltage in a resonant circuit corresponding to the second resonant inductor is k*180°, and k is an integer.

11. The resonant converter according to claim 9, wherein the phase difference between the fundamental wave of the bridge arm midpoint voltage of a first phase resonant circuit in the N-phase resonant circuits and the fundamental wave of the bridge arm midpoint voltage of a second phase resonant circuit in the N-phase resonant circuits is 360°/N;

and if the fundamental wave of the bridge arm midpoint voltage of the first phase resonant circuit in the first N-phase resonant circuit and the fundamental wave of the bridge arm midpoint voltage of the first phase resonant circuit in the second N-phase resonant circuit are collocated fundamental waves, then the phase difference between the fundamental wave of the bridge arm midpoint voltage of the first phase resonant circuit in the first N-phase resonant circuit and the fundamental wave of the bridge arm midpoint voltage of the first phase resonant circuit in the second N-phase resonant circuit is 180-360°/N.

12. The resonant converter according to claim 9, wherein the multi-path resonant circuit further comprises a controller, and the controller is connected with switches tubes in bridge arms of the N-phase resonant circuit;

the controller is configured to output a first set of driving signals to drive the switches in the upper bridge arm of each bridge arm in the N-phase resonant circuit to be turned on and turned off, and output a second set of driving signals complementary to the first set of driving signals to drive the switches in the lower bridge arm of each bridge arm in the N-phase resonant circuit to be turned on and turned off, so that the fundamental wave of the midpoint voltage of each bridge arm in the N-phase resonant circuit have the same phase as the corresponding first set of driving signals.

13. The resonant converter according to claim 9, wherein the first resonant inductor and the second resonant inductor are coupled to form a coupling inductor;

the coupling inductor comprises a magnetic core, a winding of the first resonant inductor and a winding of the second resonant inductor;

the magnetic core comprises two side posts and a center post arranged between the two side posts, and the winding of the first resonant inductor and the winding of the second resonant inductor are respectively wound on the two side posts of the magnetic core.

14. The resonant converter according to claim 13, wherein the magnetic core is made of a ferrite material, and the two side posts and the center post are all provided with an air gap.

15. The resonant converter according to claim 9, wherein the multi-path resonant circuit further comprises a transformer, and the transformer comprises a first inductor and a second inductor;

the first inductor is connected between the midpoint of the bridge arm in the resonant circuit corresponding to the first resonant inductor and the first resonant inductor, and the second inductor is connected between the midpoint of the bridge arm in the resonant circuit corresponding to the second resonant inductor and the second resonant inductor.

16. The resonant converter according to claim 9, wherein if N is an even number, then resonant inductors in the first N-phase resonant circuit and resonant inductors in the second N-phase resonant circuit are coupled in one-to-one correspondence.

\* \* \* \* \*